(12) United States Patent
Van Dyke et al.

(10) Patent No.: US 6,418,524 B1
(45) Date of Patent: Jul. 9, 2002

(54) METHOD AND APPARATUS FOR DEPENDENT SEGMENTATION AND PAGING PROCESSING

(75) Inventors: Korbin Van Dyke, Sunol; Paul Campbell, Oakland, both of CA (US)

(73) Assignee: ATI International SRL, Barbados (BB)

( * ) Notice: Subject to any disclaimer, the term of this patent is extended or adjusted under 35 U.S.C. 154(b) by 0 days.

(21) Appl. No.: 09/473,154

(22) Filed: Dec. 28, 1999

(51) Int. Cl.⁷ ............................................... G06F 12/10
(52) U.S. Cl. ........................ 711/208; 711/206; 713/100
(58) Field of Search ............................. 711/202, 206, 711/208, 209; 712/229; 713/100

(56) References Cited

U.S. PATENT DOCUMENTS

| | | |
|---|---|---|
| 4,972,338 A | 11/1990 | Crawford et al. |
| 5,297,282 A * | 3/1994 | Meilak et al. ............... 713/323 |
| 5,504,801 A * | 4/1996 | Moser et al. ................. 379/29 |
| 5,666,293 A * | 9/1997 | Metz et al. .................. 709/220 |
| 6,178,503 B1 * | 1/2001 | Madden et al. ................ 713/2 |

* cited by examiner

Primary Examiner—B. James Peikari
(74) Attorney, Agent, or Firm—Vedder, Price, Kaufman & Kammholz

(57) ABSTRACT

A method and apparatus for dependent segmentation and paging processing within a computer system include processing that begins by determining context of an operation supported by a native operating system. The context of an operation may correspond to performing an operation that is a native operating system operation or may be a legacy operating system operation. The processing then continues by setting within a corresponding segment descriptor a paging enable bit for a given segment that corresponds to the operation when the context of the operation corresponds to a legacy operating system. The setting of the paging enable bit is done in accordance with the processing of the native operating system. The processing then continues by processing the segment descriptor via segmentation processing in accordance with the legacy operating system to obtain a linear address. With the paging enable bitd, the linear address is processed to obtain a physical address.

16 Claims, 2 Drawing Sheets

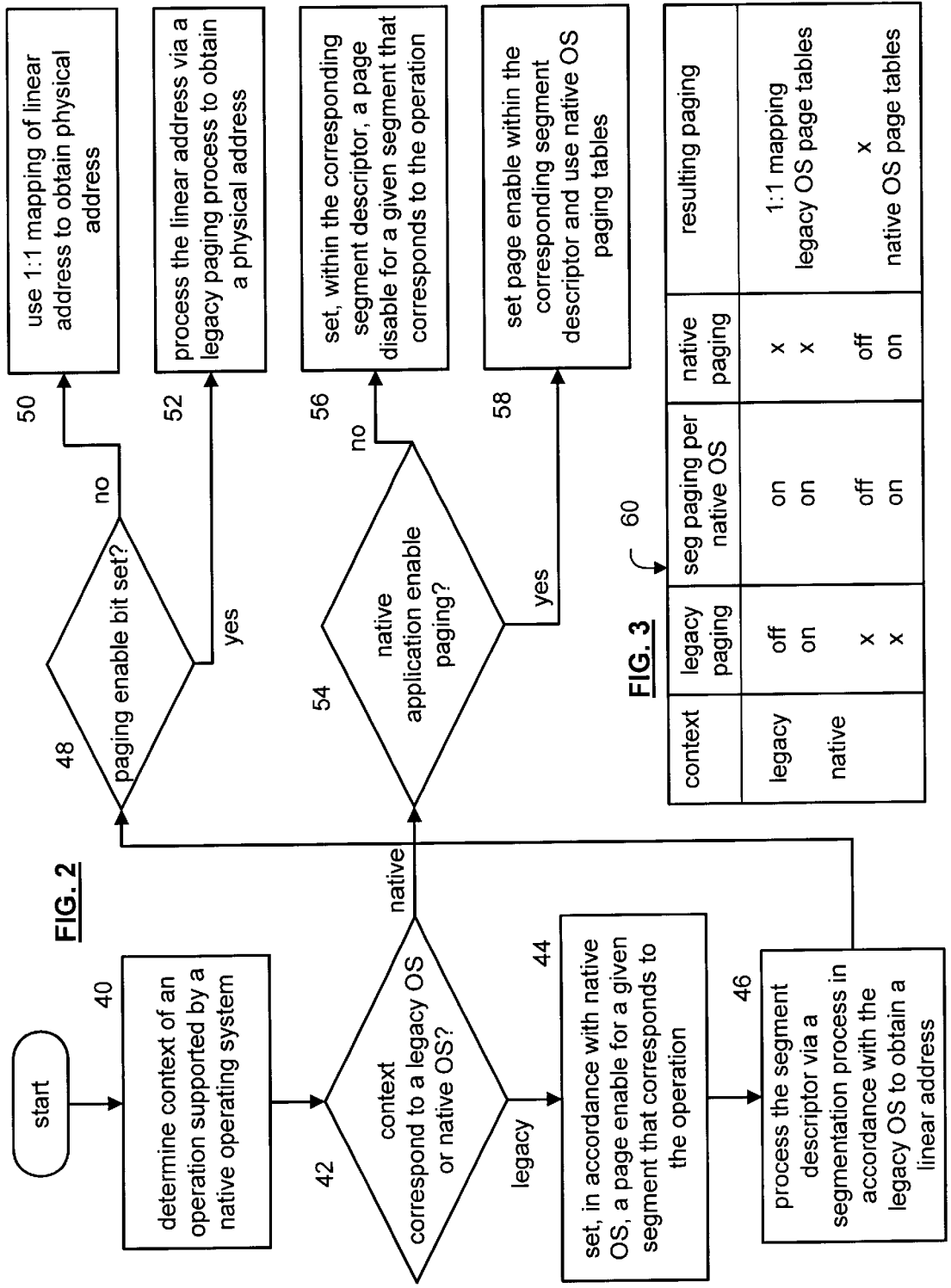

METHOD AND APPARATUS FOR DEPENDENT SEGMENTATION AND PAGING PROCESSING

TECHNICAL FIELD OF THE INVENTION

This invention relates generally to computers and more particularly to addressing schemes utilizing segmentation and paging.

BACKGROUND OF THE INVENTION

U.S. Pat. 4,972,338 issued to Crawford et. al. teaches memory management for a microprocessor system. In the microprocessor architecture an address translation unit is included which provides two levels of cache memory management. Segmentation registers and associated segmentation tables in main memory provide a first level of memory management which includes attributes bits for protection, priority, etc. A second page cache memory and associated page directory and page table and main memory provide a second level of management with independent protection on a page level.

To accommodate newer and/or more advanced architectures, a need exists for an addressing scheme that has a dependent relationship between segmentation and paging.

BRIEF DESCRIPTION OF THE DRAWINGS

FIG. 2 illustrates a logic diagram of a method for dependent segmentation and paging processing in accordance with the present invention; and FIG. 3 illustrates a table of the dependency between segmentation and paging processing in accordance with the present invention.

DETAILED DESCRIPTION OF A PREFERRED EMBODIMENT

Figure 1:
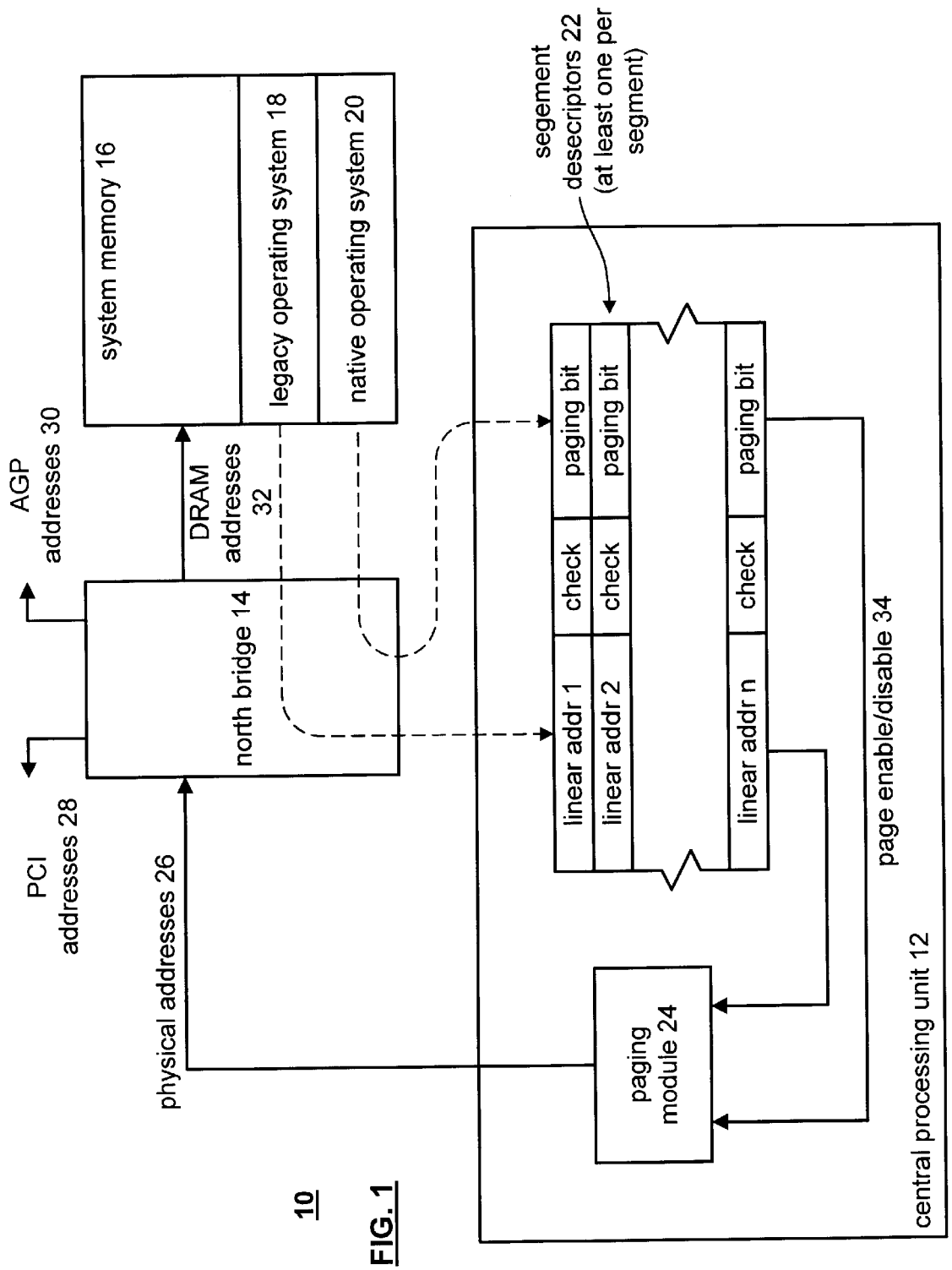
FIG. 1 illustrates a schematic and graphical diagram of a computing system 10 in accordance with the present invention.

Generally, the present invention provides a method and apparatus for dependent segmentation and paging processing within a computer system. Such a method and apparatus include processing that begins by determining context of an operation supported by a native operating system. The context of an operation may correspond to performing an operation that is a native operating system operation or may be a legacy operating system operation. The processing then continues by setting within a corresponding segment descriptor a paging enable bit for a given segment that corresponds to the operation when the context of the operation corresponds to a legacy operating system (e.g., X86). The setting of the paging enable bit is done in accordance with the processing of the native operating system. The processing then continues by processing the segment descriptor via segmentation processing in accordance with the legacy instruction set architecture, which is used by the legacy operating system, to obtain a linear address. With the paging enabled, the linear address is processed to obtain a physical address. With such a method and apparatus a dependency exists between segmentation and paging to obtain addresses, thus providing an addressing technique for use by newer and/or more advanced microprocessor architectures.

The present invention can be more fully described with reference to FIGS. 1 through 3. FIG. 1 illustrates a schematic and graphical diagram of a computing system 10. The computing system 10 includes a central processing unit 12, a north bridge 14 and system memory 16. Stored within the system memory 16 is a legacy operating system 18 (for example, X86, MIPS, etc.) and a native operating system 20. The native operating system may be a custom operating system that corresponds to a particular central processing unit 12. The central processing unit 12, which includes a processing module and memory, further includes a paging module 24 and a plurality of segment descriptors 22 wherein at least one segment descriptor corresponds to a particular segment. The use of segments and paging as independent functions are known as described in U.S. Pat. No. 4,972,338.

The operating systems 18 and 20 function together to determine the appropriate physical addresses 26 for the corresponding operation, by generating, accessing, and/or updating a segment descriptor 22. The segment descriptor includes a linear address and checks, which are generated by the legacy operating system 18. In addition, the segment descriptors 22 are expanded to include a paging bit, which is controlled by the native operating system 20. Hence, the segment descriptors now have a dependency between the paging function and the segmentation function.

Once a segment descriptor has been created, it needs to be loaded into the CPU 12. The loading of the segment descriptor will vary depending on the context of an operation. For example, when the operation is a legacy context, the legacy descriptor load instruction is processed by the native operating system, which will having the paging bit enabled. As an alternate example, when the operation is a native context, the CPU segment descriptors are manipulated directly by the native operating system.

In operation, when the central processing unit 12 has a memory access request, it utilizes the segment descriptors 22 that have been loaded. The particular segment descriptor used will depend on the type of operation, which may be an individual operation (e.g., load, store, or instruction fetch). For instance, when the operation is an operation from the legacy instruction set, the segment descriptor that was loaded in accordance with the legacy descriptor load instruction.

When the paging bit is set by the native operating system 20 within the segment descriptor, a page enable/disable signal 34 is provided to the paging module 24. The paging module 24, which includes a plurality of translations built from page tables and page directories, utilizes the linear address to generate the corresponding physical addresses 26 when the page enable/disable signal 34 is enabled. When the page enable/disable signal 34 is disabled, the paging module 24 passes the linear address, which functions as the physical address 26. The north bridge 14 interprets the physical addresses 26 to determine whether PCI addresses 28 are being generated, AGP addresses 30 are being generated or DRAM addresses 32 are being generated.

FIG. 2 illustrates a logic diagram of a method for dependent segmentation and paging processing that may be executed by the central processing unit 12. The process begins at step 40 where the context of an operation supported by a native operating system is determined. The process then proceeds to step 42 where a determination is made as to whether the context of the operation corresponds to a legacy operating system or a native operating system. When the context corresponds to a legacy operating system, the process proceeds to step 44. At step 44, a paging enable bit for a given segment that corresponds to the operation is set in accordance with the native operating system. This is done within a corresponding segment descriptor. As such, segmentation and paging are now dependent and can be done on a segment by segment basis.

The process then proceeds to step 46 where the segment descriptor is processed via a segmentation process in accordance with the legacy operating system to obtain a linear address. The process then proceeds to step 48 where a determination is made as to whether the paging enable bit is set. If not, the process proceeds to step 50 where a one to one mapping of the linear address is used to obtain the physical address. This may be done by determining whether an application running on the legacy operating system has enabled paging. If it has not enabled paging, the linear address is processed via the paging process to obtain a physical address wherein the paging process includes mapping the linear address to the physical address and storing the mapping in a translation look aside table.

If the paging is enabled via the native operating system, the process proceeds to step 52. At step 52 the linear address is processed via a legacy paging process to obtain the physical address. The legacy paging process includes determining whether an application running on the legacy operating system has enabled paging. When the application running on the legacy operating system has enabled paging, the linear address is processed via the paging process to obtain the physical address. Such a paging process includes generating a page table entry for the linear address, generating a page directory entry for the page table entry and utilizing the page table entry, the page directory and a portion of the linear address to generate a translation look aside table entry for the physical address.

If, at step 42, it was determined that the context of the operation corresponds to the native operating system, the process proceeds to step 54. At step 54, a determination is made as to whether the native application has enabled paging. If not, the process proceeds to step 56 where a paging enable bit is cleared (or a paging disable bit is set) within the corresponding segment descriptor for a given segment that corresponds to the operation.

If, however, the native application has enabled paging, the process proceeds to step 58. At step 58, the paging enable bit is set within the corresponding segment descriptor and utilizes native operating system page tables to execute the paging function.

FIG. 3 illustrates a table 60 that demonstrates the dependency of segmentation processing and paging processing. As illustrated, the table includes a context field, a legacy enabled paging field, a segment paging per native operating system field, a native paging enable field and a paging result field. As shown, when the context is in the legacy mode, the per segment paging in accordance with the native operation system is enabled such that the paging results of one to one mapping or legacy operating system page tables are used. When the context is in the native operating system, it is irrelevant what the legacy paging functions are and the native paging is enabled in accordance with the native paging selection.

The preceding discussion has presented a method and apparatus for dependent segmentation processing and paging processing to obtain addresses within a computing system. As one of average skill in the art would appreciate, other embodiments of the present invention may be derived based on the teachings presented herein without deviating from the scope of the claims.

What is claimed is:

1. A method for dependent segmentation and paging processing, the method comprises the steps of:

a) determining context of an operation supported by a native operating system;

b) when the context of the operation corresponds to a legacy operating system, setting, within a corresponding segment descriptor, a paging enable bit for a given segment that corresponds to the operation in accordance with the native operating system;

c) processing the segment descriptor via segmentation processing in accordance with the legacy operating system to obtain a linear address; and d) when the paging enable bit is set for the give segment, processing the linear address via a paging process to obtain a physical address.

2. The method of claim 1 further comprises:

when the context of the operation corresponds to the native operating system, determining whether a native application running on the native operating system has enabled paging; and when the native application running on the native operating system has enabled paging, setting, within the corresponding segment descriptor, a paging enable bit for the given segment that corresponds to the operation.

3. The method of claim 2, when the paging enable bit is set, utilizing page tables associated with the native operating system.

4. The method of claim 1 further comprises:

when the context of the operation corresponds to the native operating system, determining whether a native application running on the native operating system has disabled paging; and when the native application running on the native operating system has disabled paging, setting, within the corresponding segment descriptor, a page disable for the given segment that corresponds to the operation.

5. The method of claim 1, wherein step (d) further comprises:

determining whether an application running on the legacy operating system has enabled paging;

when the application running on the legacy operating system has enabled paging, processing the linear address via the paging process to obtain a physical address, wherein the paging processing includes:

generating a page table entry for the linear address;

generating a page directory entry for the page table entry;

utilizing the page table entry, the page directory entry, and a portion of the linear address to generate a translation look-aside entry for the physical address.

6. The method of claim 1, wherein step (d) further comprises:

determining whether an application running on the legacy operating system has enabled paging;

when the application running on the legacy operating system has not enabled paging, processing the linear address via the paging process to obtain a physical address, wherein the paging processing includes:

mapping the linear address to the physical address; and storing the mapping in a translation look-aside table.

7. An apparatus for dependent segmentation and paging processing, the apparatus comprises:

a processing module; and memory operably coupled to the processing module, wherein the memory includes operational instructions that cause the processing module to: (a) determine context of an operation supported by a native operating system; (b) when the context of the operation corresponds to a legacy operating system, set, within a corresponding segment descriptor, a paging enable bit for a given segment that corresponds to the operation in accordance with the native operating system; (c) process the segment descriptor via segmentation processing in accordance with the legacy operating system to obtain a linear address; and (d) when the paging enable bit is set for the give segment, process the linear address via a paging process to obtain a physical address.

8. The apparatus of claim 7, wherein the memory further comprises operational instructions that cause the processing module to:

when the context of the operation corresponds to the native operating system, determine whether a native application running on the native operating system has enabled paging; and when the native application running on the native operating system has enabled paging, set, within the corresponding segment descriptor, a paging enable bit for the given segment that corresponds to the operation.

9. The apparatus of claim 8, wherein the memory further comprises operational instructions that cause the processing module to, when the paging enable bit is set, utilize page tables associated with the native operating system.

10. The apparatus of claim 7, wherein the memory further comprises operational instructions that cause the processing module to:

when the context of the operation corresponds to the native operating system, determine whether a native application running on the native operating system has disabled paging; and when the native application running on the native operating system has disabled paging, set, within the corresponding segment descriptor, a page disable for the given segment that corresponds to the operation.

11. The apparatus of claim 7, wherein the memory further comprises operational instructions that cause the processing module to:

determining whether an application running on the legacy operating system has enabled paging;

when the application running on the legacy operating system has enabled paging, process the linear address via the paging process to obtain a physical address, wherein the paging processing includes:
generate a page table entry for the linear address;
generate a page directory entry for the page table entry;
utilize the page table entry, the page directory entry, and a portion of the linear address to generate a translation look-aside entry for the physical address.

12. The apparatus of claim 7, wherein the memory further comprises operational instructions that cause the processing module to:

determine whether an application running on the legacy operating system has enabled paging;

when the application running on the legacy operating system has not enabled paging, process the linear address via the paging process to obtain a physical address, wherein the paging processing includes:
map the linear address to the physical address; and
store the mapping in a translation look-aside table.

13. An apparatus for dependent segmentation and paging processing, the apparatus comprises:

a legacy operating system module;

a native operating system module, wherein the native operating system module emulates operations corresponding to the legacy operating system;

a plurality of segments, wherein each of the plurality of segments includes at least one segment descriptor, and wherein the at least one segment descriptor includes a base address, check values, and a paging bit, and wherein the paging bit is set by the native operating system module based on context of an operation supported by the native operating system module; and a paging module operably coupled to the plurality of segments, wherein the paging module generates a physical address based on the at least one segment descriptor.

14. The apparatus of claim 13, wherein the paging module comprises legacy page tables to generate the physical address when the paging bit is set, the context of the operation is in accordance with the legacy instruction set architecture, and the operation indicates legacy paging.

15. The apparatus of claim 13, wherein the paging module comprises a linear conversion module to linearly map the base address to the physical address when the paging bit is clear, the context of the operation is in accordance with the legacy operating system, and the operation indicates no legacy paging.

16. The apparatus of claim 13, wherein the paging module comprises native page tables to generate the physical address when the paging bit is set, and the context of the operation is in accordance with the native operating system.

\* \* \* \* \*